United States Patent [19]

Jasper et al.

[11] Patent Number: 5,595,052
[45] Date of Patent: Jan. 21, 1997

[54] BAT FOR A REEL HAVING AN ANTI-WRAP EXTENSION

[75] Inventors: Edward P. Jasper, Mendota; Roderick J. Jensen, Moline, both of Ill.

[73] Assignees: Deere & Company, Moline; HCC, Inc., Mendota, both of Ill.

[21] Appl. No.: 511,572

[22] Filed: Aug. 4, 1995

[51] Int. Cl.[6] ........................................ A01D 57/03
[52] U.S. Cl. .................... 56/220; 56/130; 56/227; 56/364
[58] Field of Search .............. 56/364, 220, 226, 56/227, 221, 225, DIG. 9, DIG. 20, 128, 130

[56] References Cited

U.S. PATENT DOCUMENTS

| | | | |
|---|---|---|---|
| 3,158,976 | 12/1964 | Scheidenhelm | 56/220 |
| 4,472,928 | 9/1984 | Easton | 56/220 |
| 4,630,432 | 12/1986 | Love et al. | 56/220 |
| 4,776,155 | 10/1988 | Fox et al. | 56/220 |
| 4,833,869 | 5/1989 | Klein | 56/220 |
| 4,882,899 | 11/1989 | Jasper et al. | 56/220 |
| 4,891,932 | 1/1990 | Johnson | 56/158 |

FOREIGN PATENT DOCUMENTS

| | | | |
|---|---|---|---|
| 666093 | 9/1938 | Germany | 56/220 |
| 1224081 | 9/1966 | Germany | 56/220 |

*Primary Examiner*—Terry Lee Melius

[57] ABSTRACT

A pickup reel is provided with an anti-wrap extension that can be easily mounted to one of the elongated tubes. The anti-wrap extension increases the size of the bat to prevent wrapping. The tine is provided with an upstanding projection having a mounting screw for securing the anti-wrap extension to the tine. In addition, the extension is provided with a downwardly projecting flange having mounting apertures into which the tines are inserted.

6 Claims, 1 Drawing Sheet

BAT FOR A REEL HAVING AN ANTI-WRAP EXTENSION

BACKGROUND OF THE INVENTION

1. Field of the Invention

The invention is directed to an anti-wrap extension that can be mounted to existing reels used on agricultural harvesting platforms.

2. Description of the Prior Art

Combines are large agricultural machines for retrieving grain from a crop. They perform five basic crop harvesting operations: harvesting, threshing, separating, cleaning and handling. A harvesting platform, corn head, row crop head or a pickup platform is located at the front of the combine for cutting or gathering the crop and directing it to a feederhouse which directs the harvested crop to the other operations.

Harvesting platforms maybe provided with a pickup reel. A pickup reel has a number of downwardly projecting tines mounted to elongated bats which engage a down or tangled crop pulling the crop against a cutterbar which cuts the crop from the ground. A transverse auger directs the cut crop to the feederhouse for further processing.

Pickup reels may comprise five or six elongated tubes that are mounted to at least two spiders. The elongated tubes form bats that extend across the width of the platform. A series of downwardly projecting tines are mounted along the length of each tube. U.S. Pat. Nos. 4,776,155, 4,833,869 and 4,891,932 disclose various bat configurations for reels.

The reel operates in a great variety of crop conditions. It directly engages the crop and in some conditions is susceptible to wrapping or hairpinning of crop around the elongated tube. When wrapping occurs reel performance deteriorates significantly. One anti-wrapping protector is proposed in U.S. Pat. No. 4,472,928.

SUMMARY

It is an object of the present invention to provide an anti-wrap extension for a pickup reel which is easily attached to the reel.

The anti-wrap extension effectively increases the cross section of the tube to reduce reel wrapping. The extension can be easily installed and removed as desired by the operator. The profile of the anti-wrap extension matches the reel bat profile to prevent gaps and spaces where hairpinning of crop material can occur.

The bat comprises an elongated circular tube to which a series of downwardly extending tines are mounted. An anti-rotation protrusion projects upwardly from the tine into a receiving hole formed in the elongated tube to prevent relative rotation between the tube and tine. The tine is provided with an upstanding projection having a mounting screw for mounting the anti-wrap extension to the bat. The anti-wrap extension is a hollow tubular member which is held in place by the mounting screw and a downwardly projecting flange having mounting apertures through which the tine is inserted.

DETAILED DESCRIPTION

Figures 1, 2:
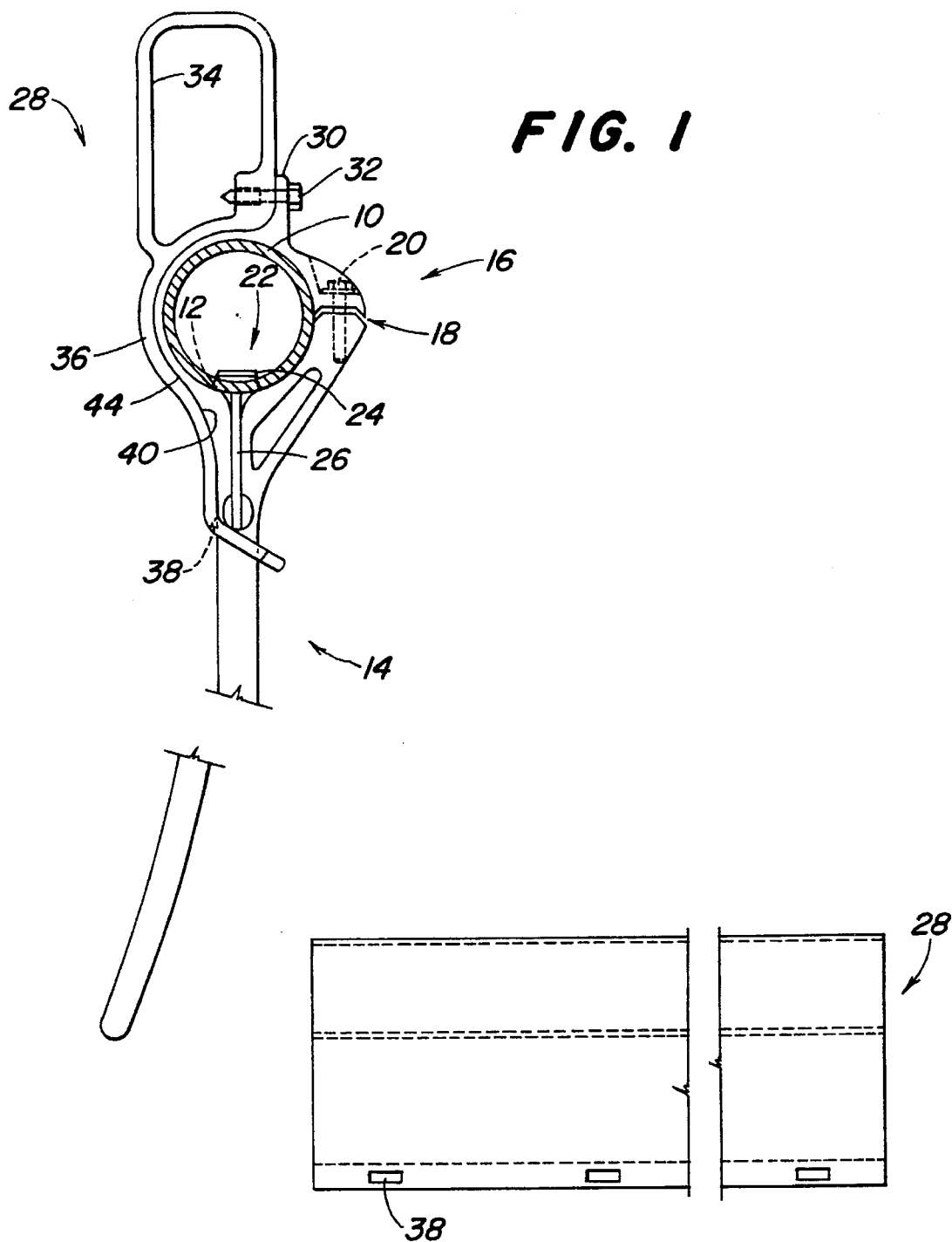
FIG. 1 is a cross sectional view of the reel bat and tine.
FIG. 2 is a rear view of the anti-wrap extension.

A typical reel comprises five or six elongated circular tubes that are radially arranged on spiders. The spiders are rotatably mounted to the harvested platform. In the present invention circular elongated tube 10 is provided with a series of downwardly oriented apertures 12, only one shown. A downwardly projecting tine 14 is mounted to the tube 10 by a connector assembly 16. The connector assembly is formed around split 18. The tine is clamped in place by screws 20 pulling the split together. The tine and the tube are provided with an anti-rotation means 22 for preventing relative rotation between the tube 10 and the tine 14. The anti-rotation means 22 comprises an upwardly extending protrusion 24 that is mounted to a pin 26 which is rooted in the tine 14. The upwardly extending protrusion engages the downwardly oriented apertures 22 of tube 10. The protrusion 24 also helps in aligning and spacing the tines 14 on the tube 10. This connector assembly is essentially identical to the one disclosed in U.S. Pat. No. 4,882,899, which is incorporated herein by reference.

The main feature of the invention is the anti-wrap extension 28 that is mounted to the tine 14. To accommodate the anti-wrap extension 28, the connector assembly 16 is provided with an upstanding projection 30 having a mounting screw 32 for securing the extension to the tine 14. The anti-wrap extension 28 comprises a hollow tubular member 34 and a downwardly extending flange 36 having a series of mounting apertures 38. The interior surface 40 of the flange 36 conforms to the exterior surface 44 of the tine 14. The upstanding projection 30 is located in front of the tubular member 34 of the anti-wrap extension 28.

In mounting the anti-wrap extension 28 to the tine 14, the mounting apertures 38 of the flange 36 are inserted over the tip of the tine 14 and slid up the tine until the interior surface 40 conforms to the exterior surface 44 of the tine 14. The mounting screw 32 then secures the anti-wrap extension 38 in place.

The circular elongated tube 10 has a diameter which is slightly larger than the width of the hollow tubular member 34 of the elongated anti-wrap extension 28.

The anti-wrap extension of the present invention can be an extruded part made from a high density plastic. It is simple to mount and remove with a minimum of tools. As such, it should not be limited by the above-described embodiment, but should be limited solely by the claims that follow.

We claim:

1. A bat for a reel of an agricultural harvesting platform; the bat comprising:

an elongated tube has a circular cross section;

a downwardly projecting tine mounted to the tube by a connector assembly, the connector assembly is provided with an upstanding projection having a mounting screw for mounting the elongated anti-wrap extension to the elongated tube, a rotation preventing means prevents the downwardly projecting tine from rotating relative to the elongated tube;

an elongated anti-wrap bat extension is mounted to the connector assembly for preventing crop material from wrapping around the elongated tube.

2. A bat as defined by claim 1 wherein the elongated anti-wrap extension is provided with a downwardly projecting flange having a mounting aperture through which the tine is inserted.

3. A bat as defined by claim 2 wherein the upstanding projection is located in front of the elongated anti-wrap extension.

4. A bat as defined by claim 3 wherein the circular cross section of the elongated tube has a diameter and the anti-wrap extension has a width, the diameter of the elongated tube is slightly larger than the width of the elongated anti-wrap extension.

5. A bat as defined by claim 4 wherein the rotation preventing means comprises a protrusion that projects upwardly from the tine into a receiving hole located in the elongated tube.

6. A bat as defined by claim 2 wherein the downwardly projecting flange is provided with an interior surface and the connector assembly and tine are provided with an exterior surface, the interior surface of the anti-wrap extension is shaped to conform to the exterior surface of the connector assembly and tine.

* * * * *